US012688739B1

(12) United States Patent
Nees et al.

(10) Patent No.: US 12,688,739 B1
(45) Date of Patent: Jul. 21, 2026

(54) VEHICLE DATA ACCESS SYSTEM WITH A PERSONAL AUTHENTICATING PROCESS

(71) Applicant: Tesla, Inc., Austin, TX (US)

(72) Inventors: Stephen Nees, Irvine, CA (US); Florian Puget, Diemen (NL); Sam Charles, Mountain View, CA (US); Brian Stuart Boggs, Menlo Park, CA (US)

(73) Assignee: Tesla, Inc., Austin, TX (US)

( * ) Notice: Subject to any disclaimer, the term of this patent is extended or adjusted under 35 U.S.C. 154(b) by 232 days.

(21) Appl. No.: 17/898,338

(22) Filed: Aug. 29, 2022

Related U.S. Application Data

(60) Provisional application No. 63/238,039, filed on Aug. 27, 2021.

(51) Int. Cl.
*G07C 5/00* (2006.01)
*G07C 5/08* (2006.01)

(52) U.S. Cl.
CPC .......... *G07C 5/0808* (2013.01); *G07C 5/008* (2013.01)

(58) Field of Classification Search
CPC .............................. G07C 5/0808; G07C 5/008
USPC .......................................................... 701/31.4
See application file for complete search history.

(56) References Cited

U.S. PATENT DOCUMENTS 8,897,952 B1 * 11/2014 Palmer .................... H04W 4/00 701/31.5
2018/0197349 A1 * 7/2018 Oesterling ............. G07C 5/008
2021/0166501 A1 * 6/2021 Rupani .................. G07C 5/008
2021/0392573 A1 * 12/2021 Staub .................... H04W 12/06
2021/0398363 A1 * 12/2021 Olalere .................. G06Q 10/20
2022/0245598 A1 * 8/2022 Tong ................ G06K 19/06037
2023/0356738 A1 * 11/2023 Patel .................. G01C 21/3469

FOREIGN PATENT DOCUMENTS

WO WO-2013134718 A1 * 9/2013 ............ G01D 21/00

* cited by examiner

*Primary Examiner* — Tiffany P Young

(74) *Attorney, Agent, or Firm* — Schwegman Lundberg & Woessner, P.A.

(57) ABSTRACT

The present disclosure related to the configuration and management of accessibility of vehicle data communications provided to a service technician or other third party. The service technician requests access to the vehicle data with authentication information. The network service provider can facilitate an initial authentication for access to vehicle data, provide access to the vehicle data for authenticated and authorized users, and manage revocation of vehicle data access rights via a common interface provided through the vehicle without requiring customized software, applications or external computing devices.

31 Claims, 7 Drawing Sheets

VEHICLE DATA ACCESS SYSTEM WITH A PERSONAL AUTHENTICATING PROCESS

CROSS-REFERENCE TO RELATED APPLICATIONS

This application claims prior to U.S. Provisional Application 63/238,039 entitled VEHICLE DATA COMMUNICATION ACCESS on Aug. 27, 2021. U.S. Provisional Application 63/238,039 is incorporated by reference in its entirety herein.

BACKGROUND

Generally described, computing devices and communication networks can be utilized to exchange data and/or information. In a common application, a computing device can request content from another computing device via the communication network. For example, a user at a personal computing device can utilize a browser application to request a content page (e.g., a network page, a Web page, etc.) from a server computing device via the network (e.g., the Internet). In such embodiments, the user computing device can be referred to as a client computing device and the server computing device can be referred to as a content provider. In another embodiment, the user computing device can collect or generate information and provide the collected information to a server computing device for further processing or analysis.

Generally described, a variety of vehicles, such as electric vehicles, combustion engine vehicles, hybrid vehicles, etc., can be configured with various sensors and components to facilitate operation. In some scenarios, a vehicle owner or vehicle user may require a service technician to be provided access to at least a portion of data generated or otherwise collected by a vehicle. In certain scenarios, vehicles can often include hardware and software functionality that stores data generated from vehicles from sensors and/or components installed in the vehicle or data received from a third party. In certain scenarios, the vehicles can often include hardware and software functionality that facilitate authenticating a service technician's credential to provide an access to the stored data. In some embodiments, a network-service provider can implement authentication processes that correspond to a service technician's access to the vehicle's stored data.

In some applications the service technician's identity can be authorized by an authentication process utilizing a stand-alone network-based service, generally referred to as an authentication service. The stand-alone network-based service can be hosted or provided by a common network service provider or alternative, by an independent third-party service provider. Illustratively, an authentication service may be able to authenticate individual technician as an independent process., and subsequently provided related authentication processing results to one or more vehicles. For example, in some embodiments, communications and associated interactions between an authentication service and a vehicle can confirm to an authentication protocol. The authentication protocol is not limited herein, and any type of commercially available protocol can be utilized based on a specific application.

BRIEF DESCRIPTION OF THE DRAWINGS

This disclosure is described herein with reference to drawings of certain embodiments, which are intended to illustrate, but not to limit, the present disclosure. It is to be understood that the accompanying drawings, which are incorporated in and constitute a part of this specification, are for the purpose of illustrating concepts disclosed herein and may not be to scale.

DETAILED DESCRIPTION

Figure 1:
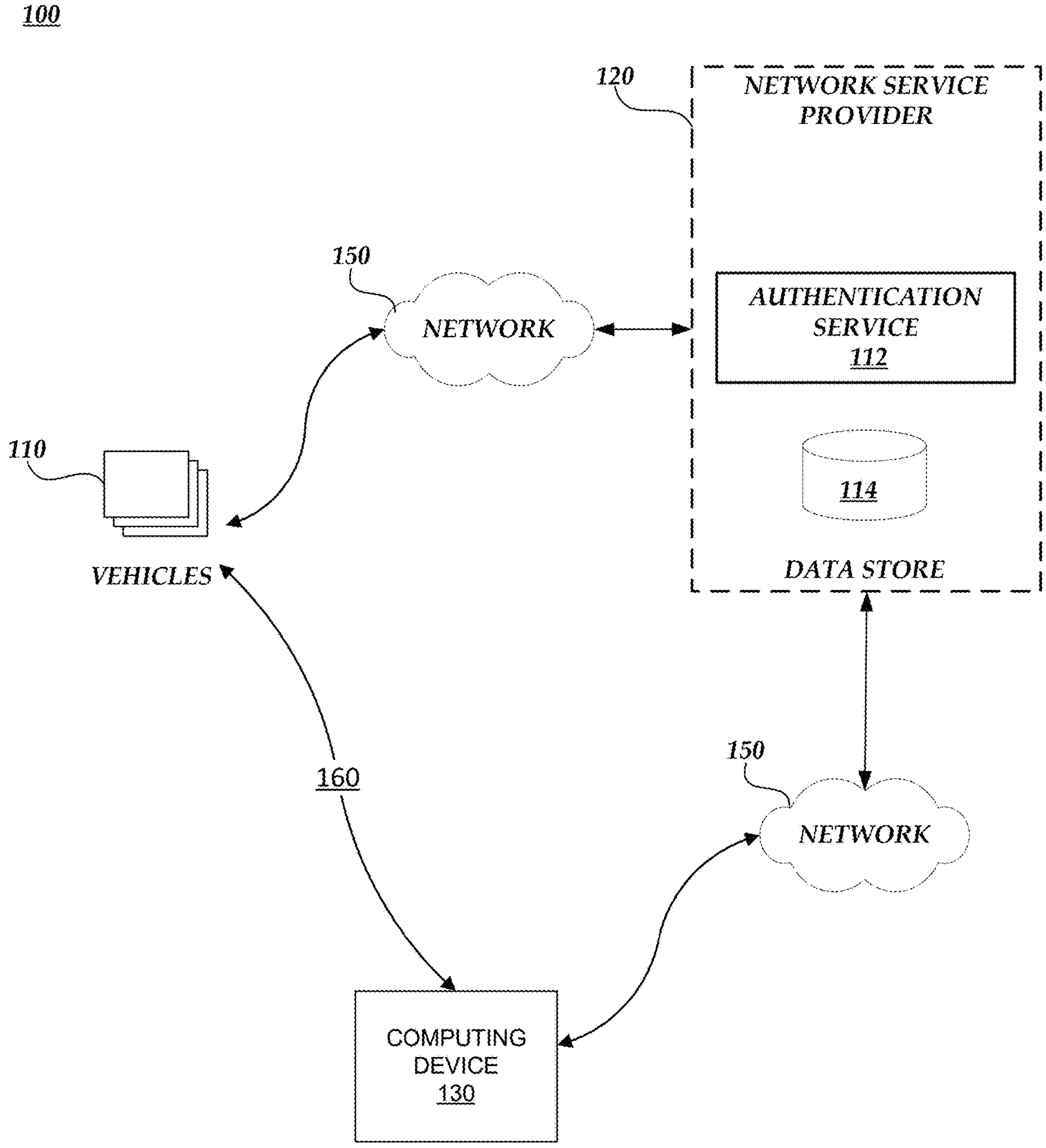
FIG. 1 depicts a block diagram of an illustrative environment for providing a vehicle data communication access in accordance with one or more aspects of the present application.

Aspects of the present disclosure related to the configuration and management of data communications associated with a vehicle. By way of illustrative example, aspects of the present application correspond to management of data communications to obtain data generated or collected by a vehicle (e.g., "vehicle data"), which can include, but is not limited to, logs of information previously collected or generated by sensor and processing components, current vehicle data, or third-party data collected by the vehicle, and the like. In another illustrative examples, aspects of the present application correspond to management of data communications to provide configuration data or executable code to a vehicle, such as diagnostic applications, repair applications, and the like.

In accordance with an illustrative embodiment, one or more aspects of the present application relate to the management and accessibility of vehicle data communications provided to a service technician or other third party. The network service provider can facilitate an initial authentication for access to vehicle data, provide access to the vehicle data for authenticated and authorized users, and manage revocation of vehicle data access rights via a common interface provided through the vehicle without requiring customized software, applications or external computing devices.

In some embodiments, the information provided by the components can include processed information in which a controller, logic unit, processor, and the like has processed sensor information and generated additional information, such as a vision system that can utilize inputs from one or more camera sensors and provide outputs corresponding to identification of environmental conditions that promote accumulation of objects/obstructions on the fascia (e.g., a processing of raw camera image data and the generation of outputs corresponding to the processing of the raw camera image information). The camera sensor may be the sensor component that is associated with the heater element. In other embodiments, the camera sensors can be separate from the sensor components, such as for non-camera sensor components or vehicles having multiple camera sensors. In still another example, a control component can utilize additional information obtained from, or otherwise associated with, positioning systems, calendaring systems, or time-based systems. In still a further example, the historical information can be incorporated as a separate information source to the control component or be utilized to process at least some portion of the set of information sources, such as detected vehicle speed, external temperature measurements, and operational status of the windshield wiper, vision system (e.g., camera inputs), location systems (e.g., GPS systems), timing information, operational status of the radar components, etc.

Generally, traditional approaches to data communication management between a vehicle and a third-party technician is defined according to physical proximity between the vehicle and the technician and customized computing devices that are required to access information accessible by the vehicle. For example, a customer tenders a vehicle to a service center that provides the technician with physical access to the vehicle. To access the information, the technician must then utilize specialized hardware or software that can access the vehicle data or execute code. For example, the technician may have to connect a specialized hardware to a vehicle's on-board diagnostic (OBD) port to access to the vehicle.

To address at least a portion of the above-identified inefficiencies, a network service provider can facilitate the authentication of data communications between a vehicle and one or more third-parties, generally referred to as technicians. The network service provider can authenticate the technicians in a manner that allows the technician to access vehicle data or interface with the vehicle via vehicle interfaces. Illustratively, the vehicle interfaces can correspond to a specific mode of operation, such as diagnostic mode or repair mode, that provides the technician with one or more interfaces. In other embodiments, the technician may still be to access at least some portion of the interfaces via other computing devices, such as laptops, tablets, mobile devices, etc. that may be in relatively close proximity to the vehicle (e.g., a short wireless connection).

Illustratively, by utilization of a network service provider, third-parties can establish data communications with a vehicle based on some physical proximity to a vehicle. This may allow a third party, such as a technician, to obtain vehicle data to facilitate diagnosis of vehicle performance, identification of potential issues, advanced ordering of parts, and the like. The data communications can also allow the third parties to cause the vehicle to execute executable code or configurations that facilitate diagnostics, repairs, updates, upgrades and the like. Still further, customers can control one or more attributes of the data communication channels including duration of access, type of access, restrictions and the like.

In some embodiments, an authentication service can be implemented to the network-service provider. The authentication service may authenticate a technician and provide an authorized information to the vehicle. Illustratively, the authentication service may identify one or more attributes related to a technician, such as the technician's credential. For example, a technician by utilizing a computing device may provide a credential information to the authentication service. In this example, the authentication service may authenticate the technician by verifying the credential information and authorize the technician to access to the vehicle data.

In some embodiments, a vehicle may include one or more electronic components positioned in or on a vehicle, where the electronic component is configured to communicate with the network service provider and the computing device. In some embodiments, the vehicle may include electronic components and storage to store the vehicle data. In these embodiments, any data generated from the vehicle can be stored in the storage. The data, for example, can include log data generated from sensors installed in the vehicle, any processed data related to the vehicle operation such as engine oil data, coolant temperature, milage, oxygen, knocking information from various sensors, etc. The data can also include diagnosed data, an automated driving (e.g., self driving) related data. In one embodiment, the data can be received from an external device.

Although the various aspects will be described m accordance with illustrative embodiments and combination of features, one skilled in the relevant art will appreciate that the examples and combination of features are illustrative in nature and should not be construed as limiting. More specifically, aspects of the present application may be applicable with various types of vehicle data or vehicle processes. However, one skilled in the relevant art will appreciate that the aspects of the present application are not necessarily limited to application to any particular type of vehicle data, data communications or illustrative interaction between third parties, a technician, and a network service provider.

FIG. 1 depicts a block diagram of an illustrative environment 100 for providing a vehicle data communication access in accordance with one or more aspects of the present application. The system I 00 can comprise a network, the network connecting a set of vehicles 110, a network service provider 120, and one or more computing devices 130. The components may correspond to software modules implemented or executed by one or more external computing devices, which may be separate stand-alone external computing devices. Accordingly, the components of the network service provider 120 should be considered as a logical representation of the service, not requiring any specific implementation on one or more external computing devices.

The computing device 130, as depicted in FIG. 1, can be any computing device such as a desktop, laptop, personal computer, tablet computer, wearable computer, server, personal digital assistant (PDA), hybrid PDA/mobile phone, mobile phone, smartphone, set-top box, voice command device, digital media player, and the like. The computing device 130 may execute an application (e.g., a browser, a stand-alone application, etc.) that allows a user to access interactive user interfaces, view images, analyses, aggregated data, and/or the like as described herein.

Network 150, as depicted in FIG. 1, connects the vehicles 110, computing devices, 130, and network service provider 120. The network 150 can connect any number of devices. In some embodiments, the network service provider 120 provides network-based services to computing devices via a network. A network service provider implements network-based services and refers to a large, shared pool of network-accessible computing resources (such as compute, storage, or networking resources, applications, or services), which may be virtualized or bare-metal. The network service provider can provide on-demand network access to a shared pool of configurable computing resources that can be programmatically provisioned and released in response to customer commands. These resources can be dynamically provisioned and reconfigured to adjust to the variable load. The concept of "cloud computing" or "network-based computing" can thus be considered as both the applications delivered as services over the network and the hardware and software in the network service provider that provide those services.

A network 160 can comprise any combination of wired and/or wireless networks, such as one or more direct communication channels, local area network, wide area network, personal area network, and/or the Internet, for example. In some embodiments, communication between the vehicle 110 and the computing device 130 may be performed via a short-range communication protocol, such as Bluetooth, Bluetooth low energy ("BLE"), and/or near field communications ("NFC"). Communication between the vehicle 110 and the network service provider 120 can occur via network 150, such as via one or more secured networks, such as a local area network that communicates securely via the Internet with the network service provider 120. However, networks 150, 160 may include some or all of the same communication protocols, services, hardware, etc. Thus, although the discussion herein may describe communication between the vehicle 110 and the computing device 130 via the network 160 and communication between the vehicle 110 and the network service provider 120 via the network 150, communications of the devices are not limited in this manner. The various communication protocols discussed herein are merely examples, and the present application is not limited thereto.

Illustratively, the set of vehicle 110 correspond to one or more vehicles configured with data storage for storing data generated from electrical components in the vehicle 110. The data, for example, can include log data generated from sensors installed in the vehicle, any processed data related to the vehicle operation such as engine oil data, coolant temperature, milage, oxygen, knocking information from various sensors, etc. The data can also include diagnosed data, an automated driving (e.g., self driving) related data. In one embodiment, the data can be received from an external device.

Illustratively, the network service provider 120 can include an authentication service 112 that can provide functionality responsive to authenticating technicians as applied to aspects of the present application. The network service provider 120 can include one or more data stores for storing vehicle diagnostic results associated with aspects of the present application. The authentication service 112 and data store 114 in FIG. 1 are logical in nature and can be implemented in the network service provider 120 in a variety of manners.

Figure 2:
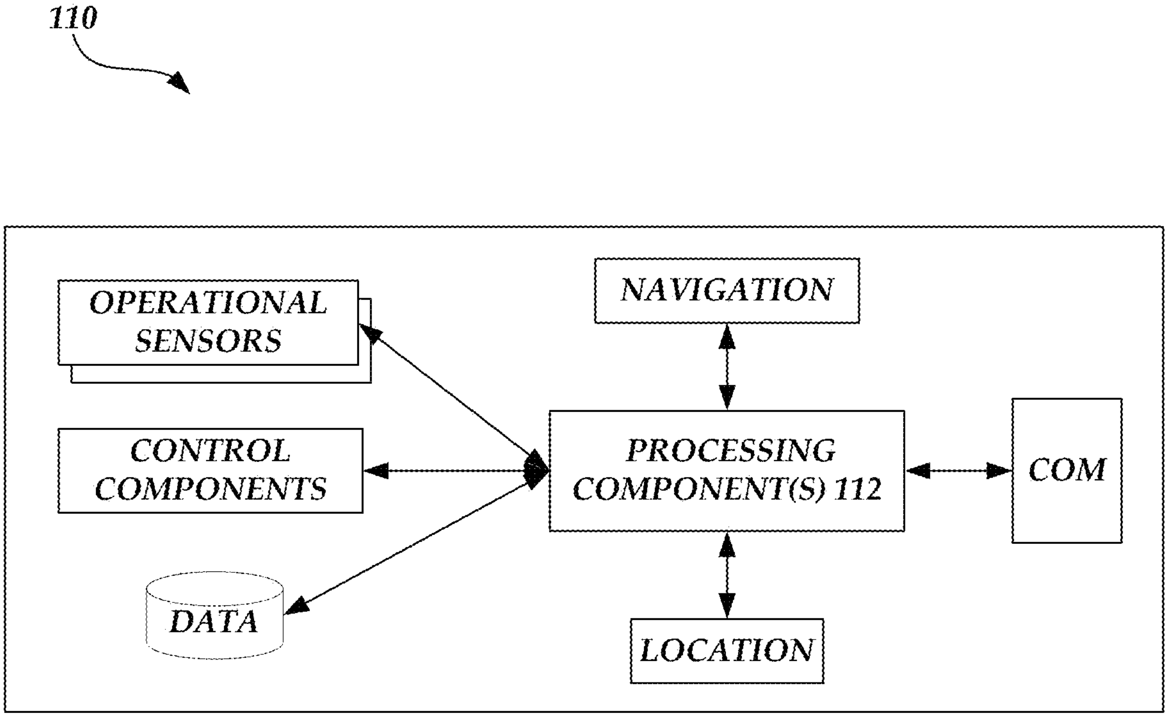
FIG. 2 illustrates an environment that corresponds to vehicles in accordance with one or more aspects of the present application.

For purposes of illustration, FIG. 2 illustrates an environment that corresponds to vehicles 110 in accordance with one or more aspects of the present application. The environment includes a collection of local sensor inputs that can provide inputs for the operation of the vehicle or collection of information as described herein. The collection of local sensors can include one or more sensor or sensor-based systems included with a vehicle or otherwise accessible by a vehicle during operation. The local sensors or sensor systems may be integrated into the vehicle. Alternatively, the local sensors or sensor systems may be provided by interfaces associated with a vehicle, such as physical connections, wireless connections, or a combination thereof.

In one aspect, the local sensors can include vision systems that provide inputs to the vehicle, such as detection of objects, attributes of detected objects (e.g., position, velocity, acceleration), presence of environment conditions (e.g., snow, rain, ice, fog, smoke, etc.), and the like. In some embodiments, vehicles 110 can rely on such vision systems for defined vehicle operational functions without assistance from or in place of other traditional detection systems.

In yet another aspect, the local sensors can include one or more positioning systems that can obtain reference information from external sources that allow for various levels of accuracy in determining positioning information for a vehicle. For example, the positioning systems can include various hardware and software components for processing information from GPS sources, Wireless Local Area Networks (WLAN) access point information sources, Bluetooth information sources, radio-frequency identification (RFID) sources, and the like. In some embodiments, the positioning systems can obtain combinations of information from multiple sources. Illustratively, the positioning systems can obtain information from various input sources and determine positioning information for a vehicle, specifically elevation at a current location. In other embodiments, the positioning systems can also determine travel-related operational parameters, such as direction of travel, velocity, acceleration, and the like. The positioning system may be configured as part of a vehicle for multiple purposes including self-driving applications, enhanced driving or user-assisted navigation, and the like. Illustratively, the positioning systems can include processing components and data that facilitate the identification of various vehicle parameters or process information.

In still another aspect, the local sensors can include one or more navigations system for identifying navigation related information. Illustratively, the navigation systems can obtain positioning information from positioning systems and identify characteristics or information about the identified location, such as elevation, road grade, etc. The navigation systems can also identify suggested or intended lane location in a multi-lane road based on directions that are being provided or anticipated for a vehicle user. Similar to the location systems, the navigation system may be configured as part of a vehicle for multiple purposes including self-driving applications, enhanced driving or user-assisted navigation, and the like. The navigation systems may be combined or integrated with positioning systems. Illustratively, the positioning systems can include processing components and data that facilitate the identification of various vehicle parameters or process information.

The local resources further include one or more processing component(s) that may be hosted on the vehicle or a computing device accessible by a vehicle (e.g., a mobile computing device). The processing component(s) can illustratively access inputs from various local sensors or sensor systems and process the inputted data and store the processed data. For purposes of the present application, the processing component(s) will be described with regard to one or more functions related to illustrative aspects. For example, processing component(s) in Vehicle 110 will collect and transmit the data set corresponding to the request from an authorized technicians.

The environment can further include various additional sensor components or sensing systems operable to provide information regarding various operational parameters for use in accordance with one or more of the operational states. The environment can further include one or more control components for processing outputs, such as the transmission of data through a communications output, generation of data in memory, the transmission of outputs to other processing components, and the like.

Figure 3A:
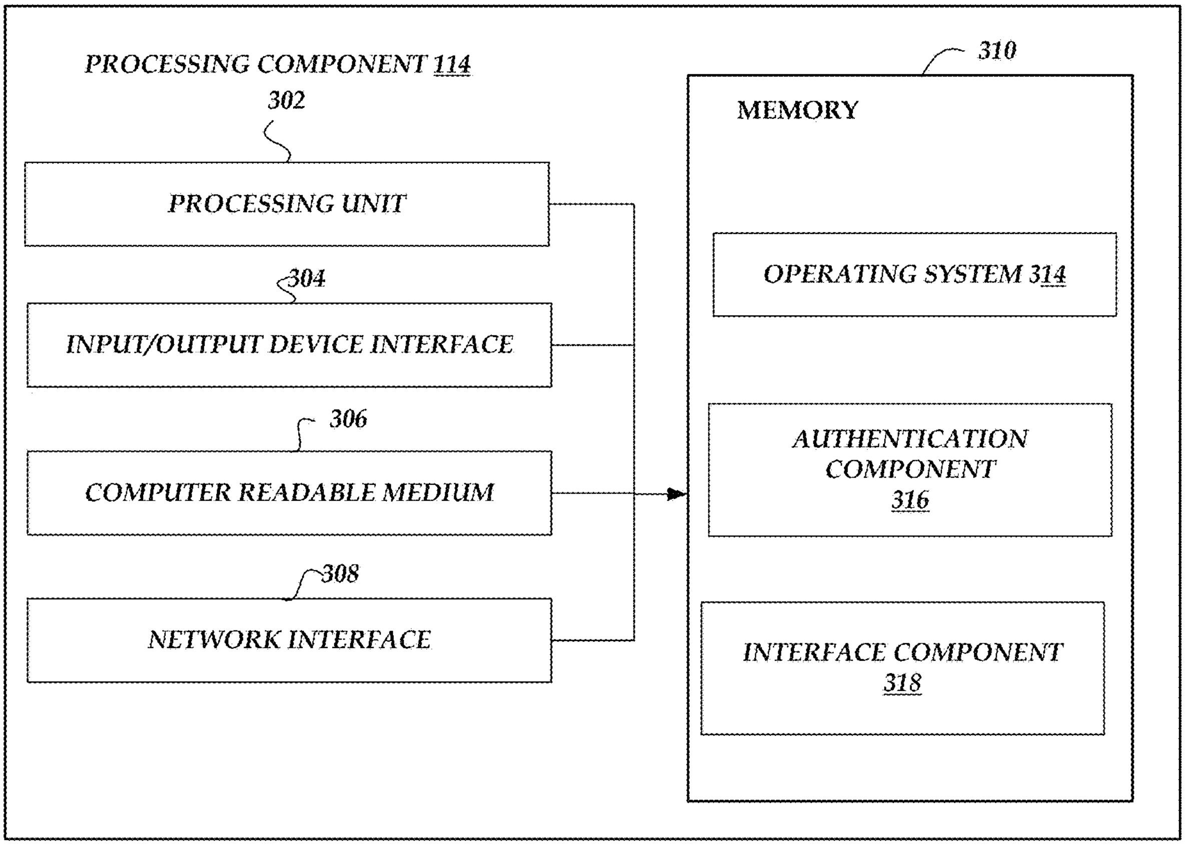
FIG. 3A depicts an illustrative architecture for implementing a processing component in accordance with aspects of the present application.

With reference now to FIG. 3A, an illustrative architecture for implementing the processing component 112 on a vehicle 110 will be described. The processing component 112 may be part of components/systems that can provide functionality associated with processing and storing vehicle data and providing an access to the stored data for a technician by receiving the technician's authorized information.

The architecture of FIG. 3A is illustrative in nature and should not be construed as requiring any specific hardware or software configuration for the processing component 112. The general architecture of the processing component 112 depicted in FIG. 3A includes an arrangement of computer hardware and software components that may be used to implement aspects of the present disclosure. As illustrated, the processing component 112 includes a processing unit 302, a network interface 308, a computer readable medium drive 306, and an input/output device interface 304, all of which may communicate with one another by way of a communication bus. The components of the processing component 112 may be physical hardware components that can include one or more circuitries and software models.

The network interface 308 may provide connectivity to one or more networks or computing systems, such as the networks 150, 160 of FIG. 1. The processing unit 302 may thus receive information and instructions from other computing systems or services via a network. The processing unit 302 may also communicate to and from memory 310 and further provide output information via the input/output device interface. In some embodiments, the processing component 112 may include more (or fewer) components than those shown in FIG. 3A.

The memory 310 may include computer program instructions that the processing unit 302 executes in order to implement one or more embodiments. The memory 310 generally includes RAM, ROM, or other persistent or non-transitory memory. The memory 310 may store an operating system 312 that provides computer program instructions for use by the processing unit 302 in the general administration and operation of the processing component 112. The memory 310 may further include computer program instructions and other information for implementing aspects of the present disclosure. For example, in one embodiment, the memory 310 includes an authentication component 318. In some embodiments, the authentication component 318 requests a technician's authorized information from the authentication service 112. In these embodiments, the authentication service 112 may provide the technician's authentication information via the network 150. In some embodiments, a technician will have authentication credentials that are provided to the network service provider and in turn can receive a token or other semi-persistent information that indicates authentication of the technician to access the vehicle 110. In these embodiments, the technician, by utilizing the computing device 130, may provide the authenticated token or other semi-persistent information to the authentication component via the network 160. After receiving the technician's authorized information, the authentication component 316 may provide the technician's authorized information to the interface component 318.

The memory 310 further include the interface component 318. The interface software 316 can provide various interfaces to allow the authorized technician to access to the vehicle data, executable code or configurations that facilitate diagnostics or repair. In some embodiments, access to the vehicle data or data communications is set up as a set of common interfaces that do not require custom computing devices or hardware for the technicians. In one embodiment, the interfaces can correspond to vehicle network information that provides access to the values/status of sensors or components or data collected from the sensors/components of the vehicles. In some embodiments, the sensors can include hardware and software components that can obtain, generate or process a variety of operational or environment information sources that are configured in the vehicle for various purposes. In some embodiments, the sensors can provide raw, collected data to the control component as well as other controls for different functionality. By way of illustration, the information provided to control component by the sensors, controller components, or other processing units can be associated with the operation of the vehicle, such as detected vehicle speed, external temperature measurements, and operational status of the windshield wiper, vision system (e.g., camera inputs), location systems (e.g., GPS systems), timing information, operational status of the components, etc.

Figure 3B:
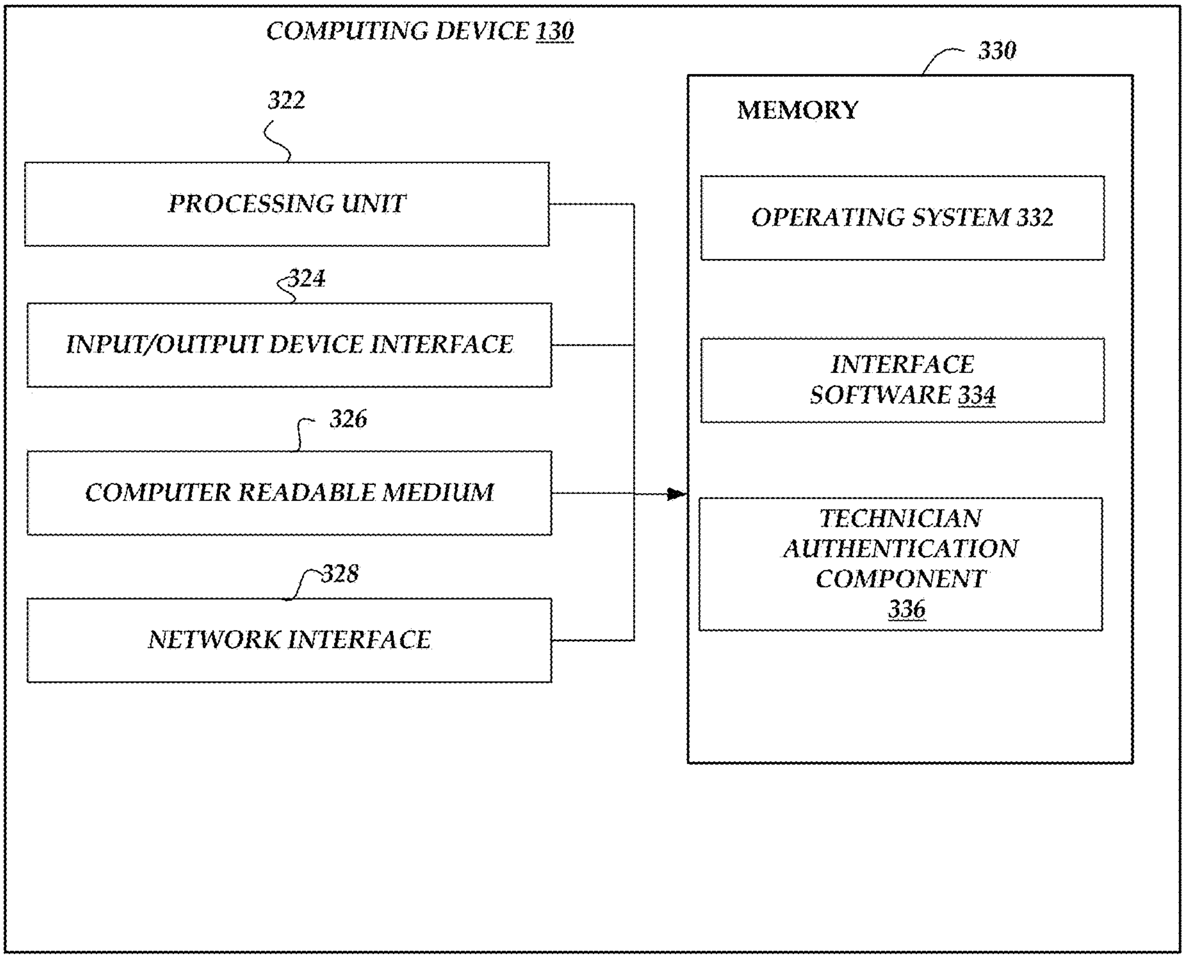
FIG. 3B depicts an illustrative architecture for implementing a computing device in accordance with aspects of the present application.

With reference now to FIG. 3B, an illustrative architecture for implementing the computing device 130 will be described. The computing device 130 may be part of components/systems that can provide functionality associated with a technician to provide the technician's authentication information and access to the vehicle data.

The architecture of FIG. 3B is illustrative in nature and should not be construed as requiring any specific hardware or software configuration for the computing device 130. The general architecture of the computing device 130 depicted in FIG. 3B includes an arrangement of computer hardware and software components that may be used to implement aspects of the present disclosure. As illustrated, the computing device 130 includes a processing unit 322, a network interface 328, a computer readable medium drive 326, and an input/output device interface 324, all of which may communicate with one another by way of a communication bus. The components of the computing device 130 may be physical hardware components that can include one or more circuitries and software models.

The network interface 328 may provide connectivity to one or more networks or computing systems, such as the networks 150, 160 of FIG. 1. The computing device 130 may thus receive information and instructions from other computing systems or services via a network. The computing device 130 may also communicate to and from memory 310 and further provide output information via the input/output device interface. In some embodiments, the computing device 130 may include more (or fewer) components than those shown in FIG. 3B.

The memory 330 may include computer program instructions that the processing unit 322 executes in order to implement one or more embodiments. The memory 330 generally includes RAM, ROM, or other persistent or non-transitory memory. The memory 330 may store an operating system 332 that provides computer program instructions for use by the processing unit 322 in the general administration and operation of the computing device 130.

The memory 330 may further include an interface software 334. In some embodiments, the interface software 334 provides a various interfaces that can be provided to a technician. For example, the technician may receives a request from user (e.g., a vehicle owner or driver) and the request can be displayed on an interface of the computing device 130. The technician also may authenticates the technician's credential by requesting the authentication process using the interface of the computing device 130. For example, the technician may provide the credential information using the interface. In some embodiments, the interface may provide the technician's authenticated information received from the authentication service 112. In these embodiment, the authenticated information can be token or other semi-persistent information that indicates authentication of the technician to access the vehicle. In some embodiments, the interface can be provided as an application programming interface.

The memory 330 may further include a technician authentication component 336 for managing the technician's authentication process. In some embodiments, the technician may have authentication credentials that are provided to the network service provider and in turn can receive a token or other semi-persistent information that indicates authentication of the technician to access the vehicle 110. In one example, an authenticated technician (e.g., third party) does not have access rights to any individual vehicle until the authenticated technician is authorized. In some embodiments, to request authorization, the technician submits an access request from the authentication service 112, providing the following information-VIN-Customer email-Reason-Access Duration request. The transmission of the request can be facilitated through the interface software 334 such as an API or other interfaces. In some embodiments, the access request can be pre-populated with profile information that defines default information, such as access duration, or specified limitations to data access rights (e.g., vehicle logs pertaining to specific components or excluding other components).

Figure 3C:
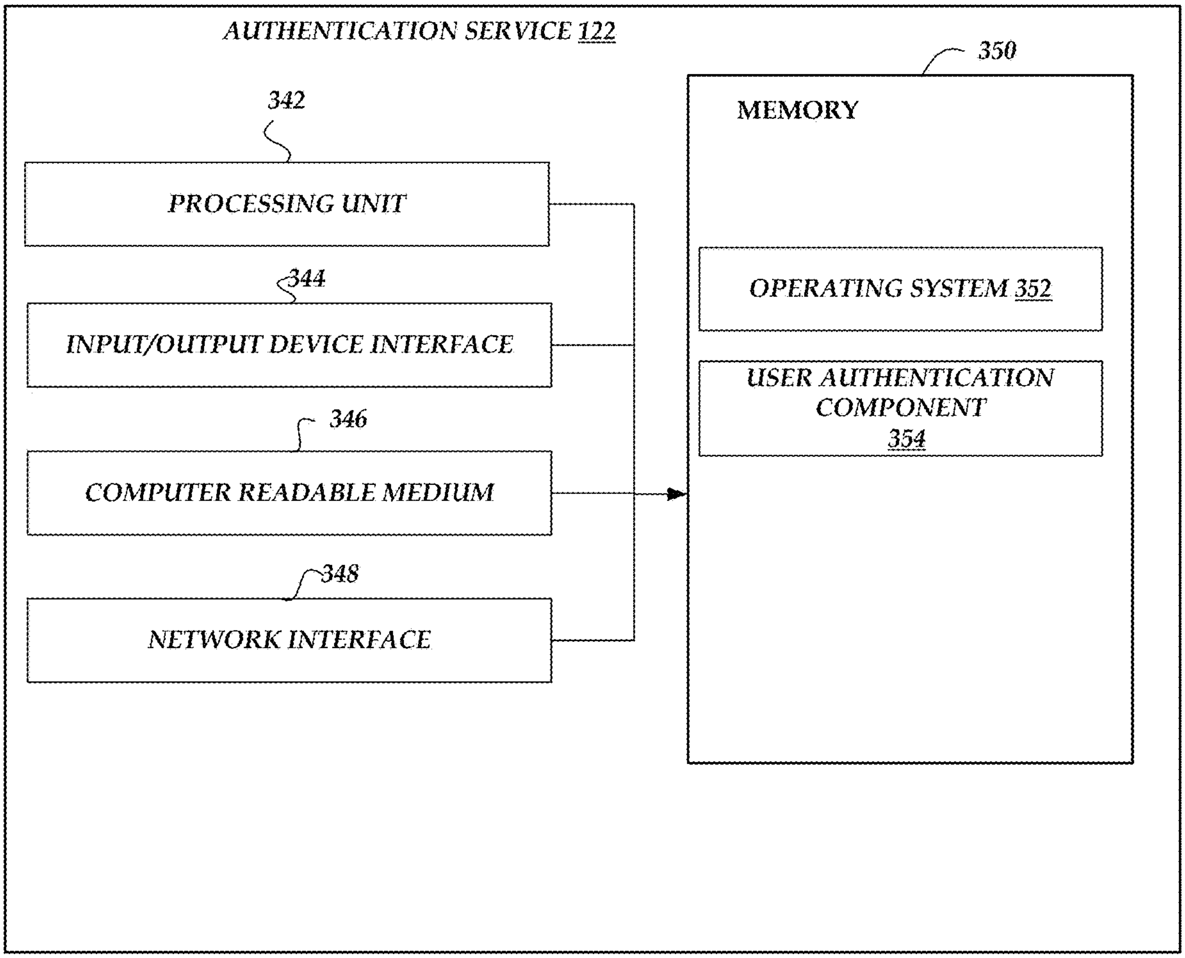
FIG. 3C depicts an illustrative architecture for implementing an authentication service in accordance with aspects of the present application.

With reference now to FIG. 3C, an illustrative architecture for implementing the authentication service 122 on a network service provider 120 will be described. The authentication service 122 may be part of components/systems that can provide functionality associated with a technician to authenticate the technician's authentication information and provide an authorized information to the technician via the computing device 130.

The architecture of FIG. 3C is illustrative in nature and should not be construed as requiring any specific hardware or software configuration for the authentication service 122. The general architecture of the authentication service 122 depicted in FIG. 3C includes an arrangement of computer hardware and software components that may be used to implement aspects of the present disclosure. As illustrated, the authentication service 122 includes a processing unit 342, a network interface 348, a computer readable medium drive 346, and an input/output device interface 344, all of which may communicate with one another by way of a communication bus. The components of the authentication service 122 may be physical hardware components that can include one or more circuitries and software models.

The network interface 348 may provide connectivity to one or more networks or computing systems, such as the networks 150, 160 of FIG. 1. The computing device 130 may thus receive information and instructions from other computing systems or services via a network. The authentication service 122 may also communicate to and from memory 350 and further provide output information via the input/output device interface. In some embodiments, the authentication service 122 may include more (or fewer) components than those shown in FIG. 3B.

The memory 350 may include computer program instructions that the processing unit 342 executes in order to implement one or more embodiments. The memory 350 generally includes RAM, ROM, or other persistent or non-transitory memory. The memory 350 may store an operating system 354 that provides computer program instructions for use by the processing unit 342 in the general administration and operation of the authentication service 122.

The memory 350 may further include an user authentication component 354 for authenticating an user. In some embodiments, the user authentication component 354 receives a technician's authentication information (e.g., credential information) from the technician. In some embodiments, the user authentication component 354 receives a technician token to ensure that the authentication rights permit access to the requested vehicle and vehicle data access type. For example, the user authentication component 354 can verify that the technician has a valid subscription and that the subscription/qualifications of the technician. For example, the user authentication component 354 can verify that the requesting technician has sufficient credentials to provide the requested service to the vehicle. In another example, the user authentication component 354 can also determine whether the requested service/access by the technician corresponds to a type of service that should be performed on the vehicle and whether the requested service is not duplicative or redundant. In still a further example, the user authentication component 354 can also determine whether the requested service is characteristic of a pattern of behavior for the identified technician (e.g., service associated with different vehicles) that can be characterized as appropriate, potentially harmful, requiring verification from the customer or the like. The user authentication component 354 can also verify aspects of the requested vehicle, the devices utilized by the technician, the like.

In some embodiments, the user authentication component 354 transmits a notification or command to the vehicle 110 indicating that data access communications have been approved. The user authentication component 354 can also provide notification or credentials to the technician that allow access to the vehicle data. The notifications may be provided via various communication channels including email, short message service, mobile application, in-vehicle, and the like. In some embodiments, the data access authorizations may also be associated with additional authorization parameters including, but not limited to, duration of access, types of data accessed, revoking criteria (e.g., criteria that will result in an automatic revoking of rights), customer notification parameters, and the like. In some embodiments, the user authentication component 354 can be configured with a customer profile that may specify default values for the authorization parameters. In other examples, the customer may be prompted to provide additional data access parameters.

Figure 4:
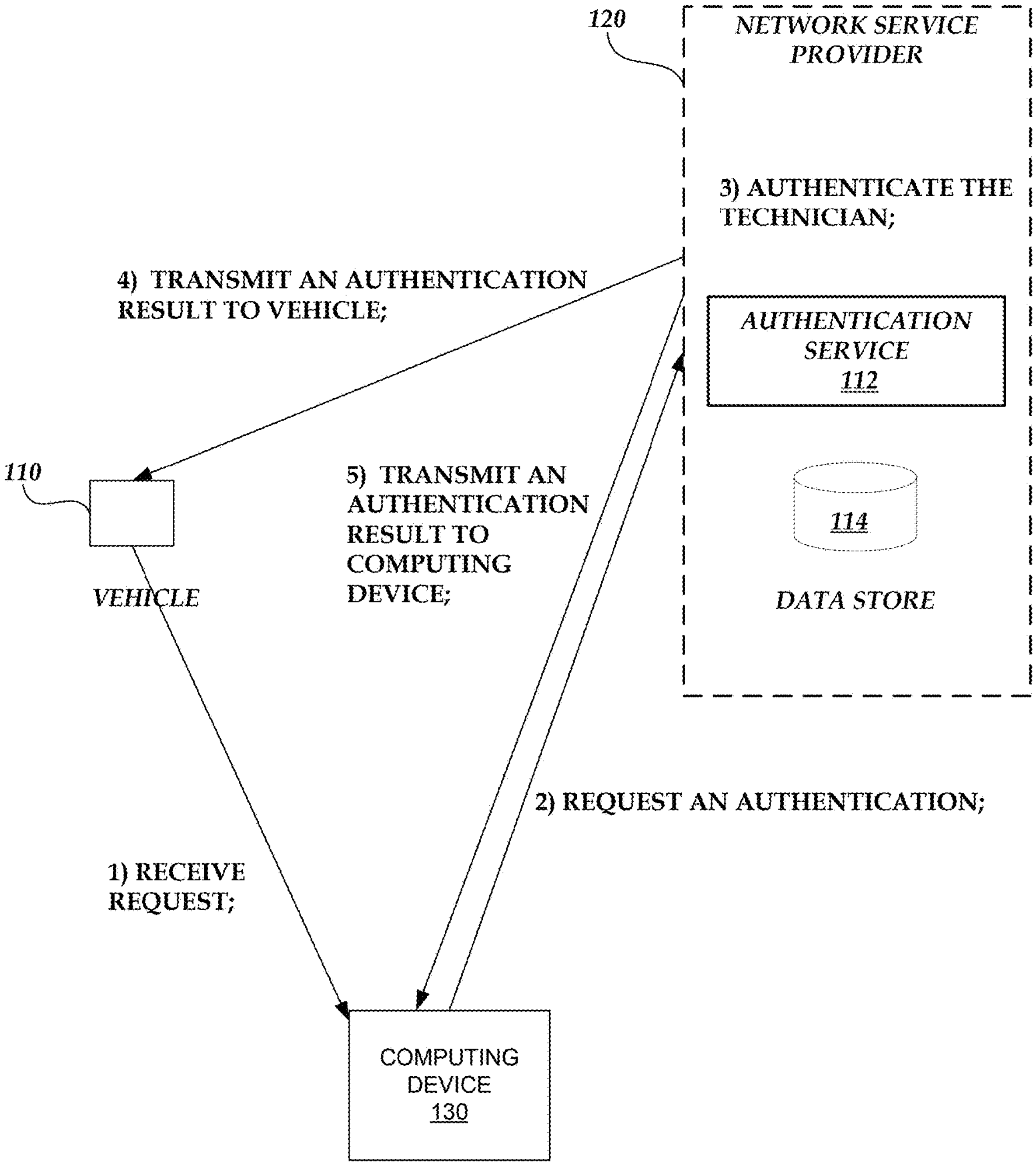
FIG. 4 is block diagrams of the illustrative environment of FIG. 1.

Turning now to FIG. 4, illustrative interactions of the components of the system 100 as shown in FIG. 1 will be described. The present application is not intended to be limited to any particular type of service or the number of individual services that may be accessed or generate processing results as part of an execution of an application on behalf of technicians. Furthermore, the present application is not intended to be limited to the number of network service providers as depicted in FIG. 1, and the type of services provided by the network service provider 120.

At (1), a technician may receive a request from an user (e.g., vehicle owner or driver). The request can be related to a vehicle service or vehicle diagnostic. Illustratively, the request may be transmitted in accordance with various illustrative protocols over the commination network. In one embodiment, the request may be initiated via interfaces provided on the vehicle. In other embodiments, the request may be initiated via interfaces provided in other computing devices, such as a mobile device.

At (2), the technician may request an authentication of the technician to access to the vehicle. Illustratively, a technician will have authentication credentials that are provided to the network service provider and in turn can receive a token or other semi-persistent information that indicates authentication of the technician to access the vehicle 110. In one example, an authenticated technician (e.g., third party) does not have access rights to any individual vehicle until the authenticated technician is authorized, as illustrated below. To request authorization, the technician submits an access request from the network service, providing specified information. By way of illustration, in one embodiment, the technician can submit vehicle identifier information, such as VIN, customer contact information or identifiers, such as customer email address, telephones, etc, and other security or access information. Additionally, the technician can also provide additional information regarding access, such as reasons for access, time of access, extent of access, and the like. The transmission of the request can be facilitated through an API or other interface. In some embodiments, the access request can be pre-populated with profile information that defines default information, such as access duration or specified limitations to data access rights (e.g., vehicle logs pertaining to specific components or excluding other components).

At (3), the authentication service 112 receives the request and validates that technician token to ensure that the authentication rights permit access to the requested vehicle and vehicle data access type. For example, the network service provider can verify that the technician has a valid subscription and that the subscription/qualifications of the technician. For example, the authentication service 112 can verify that the requesting technician has sufficient credentials to provide the requested service to the vehicle. In another example, the authentication service 112 can also determine whether the requested service/access by the technician corresponds to a type of service that should be performed on the vehicle and whether the requested service is not duplicative or redundant. In still a further example, the authentication service 112 can also determine whether the requested service is characteristic of a pattern of behavior for the identified technician (e.g., service associated with different vehicles) that can be characterized as appropriate, potentially harmful, requiring verification from the customer or the like. The authentication service 112 can also verify aspects of the requested vehicle, the devices utilized by the technician, the like.

At (4), the authentication service 112 transmits a notification or command to the vehicle indicating that data access communications have been approved. The authentication service 112 can also provide notification or credentials to the technician that allow access to the vehicle data. The notifications may be provided via various communication channels including email, short message service, mobile application, in-vehicle, and the like. In some embodiments, the data access authorizations may also be associated with additional authorization parameters including, but not limited to, duration of access, types of data accessed, revoking criteria (e.g., criteria that will result in an automatic revoking of rights), Customer notification parameters, and the like. In some embodiments, the authentication service 112 can be configured with a customer profile that may specify default values for the authorization parameters. In other examples, the customer may be prompted to provide additional data access parameters.

At (5), once the vehicle and technician receives a notification that the customer has approved, the technician can be presented with various interfaces to allow access to vehicle data, executable code or configurations that facilitate diagnostics or repair. As described previously, access to the vehicle data or data communications is set up as a set of common interfaces that do not require custom computing devices or hardware for the technicians. In one aspect, the interfaces can correspond to vehicle network information that provides access to the values/status of sensors or components or data collected from the sensors/components of the vehicles. As described above, the sensors can include hardware and software components that can obtain, generate or process a variety of operational or environment information sources that are configured in the vehicle for various purposes. In some embodiments, the sensors can provide raw, collected data to the control component as well as other controls for different functionality. By way of illustration, the information provided to control components by the sensors, controller components, or other processing units can be associated with the operation of the vehicle, such as detected vehicle speed, external temperature measurements, and operational status of the windshield wiper, vision system (e.g., camera inputs), location systems (e.g., GPS systems), timing information, the operational status of the components, etc. In some embodiments, the authenticated technician may perform the vehicle diagnostic by accessing the vehicle data, and the vehicle diagnostic result can be stored in the data store 114.

Figure 5:
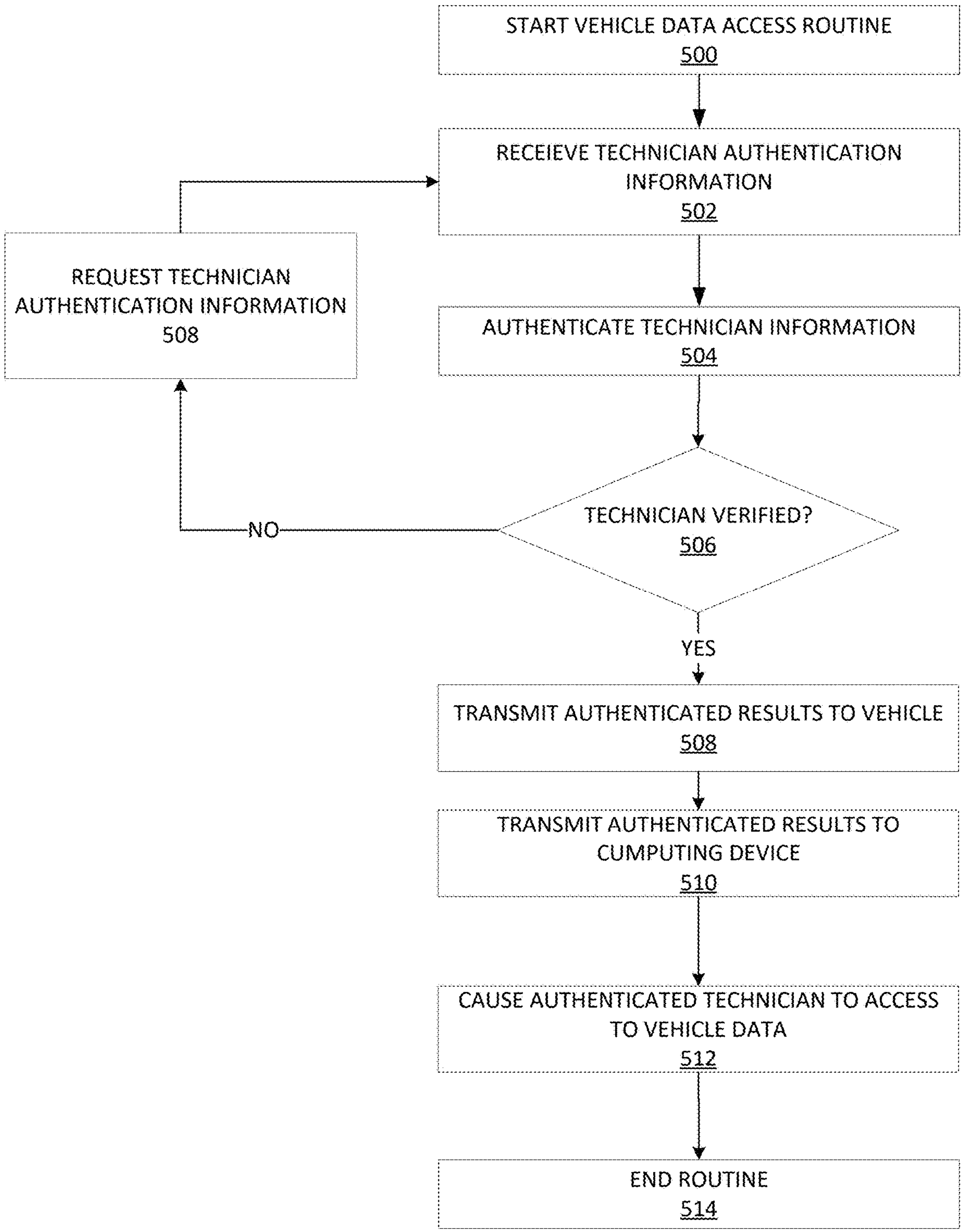
FIG. 5 is a flow chart describing a routine for accessing a vehicle data according one or more embodiment as disclosed herein.

Turning now to FIG. 5, a routine 500 for accessing a vehicle data will be described. Routine 500 is illustratively implemented by the authentication service 112.

At block 502, the authentication service 112 may receive a request from a technician to authenticate the technician's authentication information to access to the vehicle data. In some embodiments, the technician may receive a request from an user (e.g., vehicle owner or driver), where the request can be related to a vehicle service or vehicle diagnostic. Then, the technician may request an authentication of the technician to access to the vehicle. Illustratively, a technician will have authentication credentials that are provided to the network service provider and in turn can receive a token or other semi-persistent information that indicates authentication of the technician to access the vehicle 110. In one example, an authenticated technician (e.g., third party) does not have access rights to any individual vehicle until the authenticated technician is authorized, as illustrated below. By way of illustration, in one embodiment, the technician can submit vehicle identifier information, such as VIN, customer contact information or identifiers, such as customer email address, telephone, etc, and other security or access information. Additionally, the technician can also provide additional information regarding access, such as reasons for access, time of access, extent of access, and the like. The transmission of the request can be facilitated through an API or other interface. In some embodiments, the access request can be pre-populated with profile information that defines default information, such as access duration, or specified limitations to data access rights (e.g., vehicle logs pertaining to specific components or excluding other components).

At block 504, the authentication service 112 may validate the technician's authentication information. In some embodiments, the authentication service 112 validates technician token to ensure that the authentication rights permit access to the requested vehicle and vehicle data access type. For example, the network service provider can verify that the technician has a valid subscription and that the subscription/qualifications of the technician. For example, the authentication service 112 can verify that the requesting technician has sufficient credentials to provide the requested service to the vehicle. In another example, the authentication service 112 can also determine whether the requested service/access by the technician corresponds to a type of service that should be performed on the vehicle and whether the requested service is not duplicative or redundant. In still a further example, the authentication service 112 can also determine whether the requested service is characteristic of a pattern of behavior for the identified technician (e.g., service associated with different vehicles) that can be characterized as appropriate, potentially harmful, requiring verification from the customer or the like. The authentication service 112 can also verify aspects of the requested vehicle, the devices utilized by the technician, the like. At block 506, if the technician's authentication information is verified, the authentication service 112 transmit the authenticated results to the vehicle at block 510. If the technician's authentication information is not verified, the authentication service 112 may request technician authentication information at block 508.

At block 510, the authentication service 112 transmits a notification or command to the vehicle indicating that data access communications have been approved. The authentication service 112 can also provide notification or credentials to the technician that allow access to the vehicle data. The notifications may be provided via various communication channels including email, short message service, mobile application, in-vehicle, and the like. In some embodiments, the data access authorizations may also be associated with additional authorization parameters including, but not limited, duration of access, types of data accessed, revoking criteria (e.g., criteria that will result in an automatic revoking of rights), Customer notification parameters, and the like. In some embodiments, the authentication service 112 can be configured with Customer profile that may specify default values for the authorization parameters. In other examples, the customer may be prompted to provide additional data access parameters.

At block 512, the authentication service 112 may transmit the technician authenticated results to the technician via computing device 130.

At block 514, the technician may access the vehicle data. In some embodiments, once the vehicle and technician receives a notification that the customer has approved, the technician can be presented with various interfaces to allow access to vehicle data, executable code or configurations that facilitate diagnostics or repair. As described previously, access to the vehicle data or data communications is set up as a set of common interfaces that do not require custom computing devices or hardware for the technicians. In one aspect, the interfaces can correspond to vehicle network information that provides access to the values/status of sensors or components or data collected from the sensors/components of the vehicles. As described above, the sensors can include hardware and software components that can obtain, generate or process a variety of operational or environment information sources that are configured in the vehicle for various purposes. In some embodiments, the sensors can provide raw, collected data to the control component as well as other controls for different functionality. By way of illustration, the information provided to control components by the sensors, controller components, or other processing units can be associated with the operation of the vehicle, such as detected vehicle speed, external temperature measurements, and operational status of the windshield wiper, vision system (e.g., camera inputs), location systems (e.g., GPS systems), timing information, the operational status of the components, etc.

At block 514, the routine 500 can be ended.

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure. For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums). The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid-state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid-state drive) either before or after execution by the computer processor.

The flowchart and block diagrams m the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, IOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program. In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments may not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated the appended claims rather than by the foregoing description. All changes which come within the meaning and range of equivalency of the claims are to be embraced within their scope.

What is claimed is:

1. A system for providing vehicle data access, the system comprising:

at least one processor; and at least one memory storing computer-executable instructions to cause the at least one processor to perform operations comprising:

obtaining technician authentication information, associated with a technician, corresponding to a request to access an identified vehicle, at least a portion of the technician authentication information being included in the request to access the identified vehicle, the technician authentication information including credentials of the technician;

verifying the technician authentication information;

based on the request to access, determining that a type of service corresponds to the identified vehicle by verifying authorization parameters for performing the type of service requested, the authorization parameters permitting the technician to perform a first type of service and restricting the technician from performing a second type of service, the authorization parameters being based at least partially on a customer profile comprising default values for access rights and type of service permissions;

in response to verifying the technician authentication information and to determining that the type of service corresponds to the identified vehicle, identifying access information based on the verified technician authentication information, the access information identifying at least one authorized vehicle system and at least one data type relevant to the type of service requested;

transmitting a notification comprising an indication that the access to the at least one authorized vehicle system has been approved and credentials that allow access to the vehicle data;

providing the access to the at least one authorized vehicle system based on the identified access information;

receiving a vehicle diagnostic result; and storing the vehicle diagnostic result.

2. The system as recited in claim 1, wherein the technician authentication information is stored in a token, wherein the token indicates authentication of the technician to access to a vehicle data.

3. The system as recited in claim 1, wherein the technician does not have access to rights to a vehicle data until the technician authentication information is verified.

4. The system as recited in claim 1, wherein the request to access includes, a vehicle identification number, a customer email, a reason for access to a vehicle data, and a duration of access to the vehicle data.

5. The system as recited in claim 2, wherein a network service provider validates the token.

6. The system as recited in claim 1, wherein a network service provider provides a notification to the technician that allows access to a vehicle data.

7. The system as recited in claim 1, wherein the identified vehicle includes a vision system.

8. A system for providing a vehicle data access, the system comprising:

at least one processor and at least one memory storing computer-executable instructions to cause the at least one processor to perform operations comprising:

obtaining technician authentication information, the technician authentication information including credentials of the technician, the credentials of the technician being authenticated by a network service provider;

verifying authorization parameters for performing a type of service requested on an identified vehicle;

determining that the type of service corresponds to the identified vehicle based on the verified authorization parameters, the authorization parameters permitting the technician to perform a first type of service and restricting the technician from performing a second type of service, the authorization parameters being based at least partially on a customer profile comprising default values for access rights and type of service permissions;

identifying access information based on the technician authentication information, the access information identifying at least one authorized vehicle system and at least one data type relevant to the type of service requested;

transmitting a notification comprising an indication that the access to the at least one authorized vehicle system has been approved and credentials that allow access to the vehicle data; and providing the access to the at least one authorized vehicle system based on the identified access information.

9. The system as recited in claim 8, wherein the technician authentication information is stored in a token, wherein the token indicates authentication of the technician to access to a vehicle data.

10. The system as recited in claim 8, wherein the technician does not have access to rights to a vehicle data until the technician authentication information is verified.

11. The system as recited in claim 8, wherein the request to access includes, a vehicle identification number, a customer email, a reason for access to a vehicle data, and a duration of access to the vehicle data.

12. The system as recited in claim 9, wherein the network service provider validates the token.

13. The system as recited in claim 8, wherein the network service provider provides a notification to the technician that allow access to a vehicle data.

14. The system as recited in claim 8, wherein the vehicle includes a vision system.

15. The system as recited in claim 8, wherein a vehicle diagnostic system is further configured to receive a vehicle diagnostic result; and store the vehicle diagnostic result.

16. A computer-implemented method for providing vehicle diagnostic service of a vehicle and for providing vehicle data access, the method comprising:

obtaining technician authentication information corresponding to a request to access an identified vehicle, at least a portion of the technician authentication information being included in the request to access the identified vehicle, the technician authentication information including credentials of the technician;

verifying the technician authentication information;

based on the request to access, determining that a type of service corresponds to the identified vehicle by verifying authorization parameters for performing the type of service requested, the authorization parameters permitting the technician to perform a first type of service and restricting the technician from performing a second type of service, the authorization parameters being based at least partially on a customer profile comprising default values for access rights and type of service permissions;

in response to verifying the technician authentication information and to determining that the type of service corresponds to the identified vehicle, identifying access information based on the verified technician authentication information, the access information identifying at least one authorized vehicle system and at least one data type relevant to the type of service requested;

transmitting a notification comprising an indication that the access to the at least one authorized vehicle system has been approved and credentials that allow access to the vehicle data;

providing the access to the at least one authorized vehicle system based on the identified access information;

receiving a vehicle diagnostic result; and storing the vehicle diagnostic result.

17. The computer-implemented method of claim 16, wherein the technician authentication information is stored in a token, wherein the token indicates authentication of the technician to access to a vehicle data.

18. The computer-implemented method of claim 16, wherein a technician does not have access to rights to a vehicle data until the technician authentication information is verified.

19. The computer-implemented method of claim 16, wherein the request to access includes, a vehicle identification number, a customer email, a reason for access to a vehicle data, and a duration of access to the vehicle data.

20. The computer-implemented method of claim 16, wherein the vehicle includes a vision system.

21. The system of claim 1, wherein the access information restricts the technician from accessing vehicle systems unrelated to the type of service requested.

22. The system of claim 8, wherein the access information restricts the technician from accessing vehicle systems unrelated to the type of service requested.

23. The method of claim 16, wherein the access information restricts the technician from accessing vehicle systems unrelated to the type of service requested.

24. The system of claim 1, wherein the technician is a third-party technician authenticated by an authentication service to access the vehicle.

25. The system of claim 1, wherein determining that the type of service corresponds to the identified vehicle comprises determining whether the request to access is an appropriate characteristic of a pattern of behavior for the technician, wherein an appropriate characteristic includes a verified pattern of service requests that corresponds to an authorization level of the technician.

26. The system of claim 1, further comprising revoking access rights to the at least one authorized vehicle system based on revoking criteria defined in the access information.

27. The system of claim 1, further comprising providing the technician with access to the at least one authorized vehicle system based on a customer profile, wherein the customer profile comprises default values for authorization parameters.

28. The system of claim 1, further comprising providing the technician with access to the at least one authorized vehicle system based on a proximity between the technician and the identified vehicle.

29. The system of claim 1, wherein determining that the type of service corresponds to the identified vehicle includes determining that the type of service requested is not duplicative or redundant.

30. The system of claim 1, wherein the type of service includes at least one of accessing vehicle sensor data, executing diagnostic applications on the vehicle, accessing vehicle log data, configuring vehicle components, or initiating an operational mode of the vehicle.

31. The system of claim 1, wherein storing the vehicle diagnostic result comprises storing processed data related to vehicle operation including at least one of engine oil data, coolant temperature, mileage, oxygen, and knocking information.

* * * * *